United States Patent
Martinez

(10) Patent No.: US 9,115,738 B2
(45) Date of Patent: Aug. 25, 2015

(54) CONNECTOR FOR STRAW CONSTRUCTION KIT

(71) Applicant: BLANK BUBBLE LLC, New York, NY (US)

(72) Inventor: Patrick Martinez, New York, NY (US)

(73) Assignee: BLANK BUBBLE LLC, New York, NY (US)

( * ) Notice: Subject to any disclaimer, the term of this patent is extended or adjusted under 35 U.S.C. 154(b) by 0 days.

(21) Appl. No.: 13/926,529

(22) Filed: Jun. 25, 2013

(65) Prior Publication Data

US 2014/0376993 A1    Dec. 25, 2014

Related U.S. Application Data

(63) Continuation of application No. 29/443,267, filed on Jan. 15, 2013, now Pat. No. Des. 720,817.

(51) Int. Cl.
*A63H 33/08*      (2006.01)
*E04B 1/19*       (2006.01)
*F16B 7/00*       (2006.01)

(52) U.S. Cl.
CPC .............. *F16B 7/00* (2013.01); *A63H 33/084* (2013.01); *E04B 2001/1921* (2013.01); *Y10T 403/341* (2015.01); *Y10T 403/345* (2015.01)

(58) Field of Classification Search
USPC .......... 403/170, 171, 174, 176, 178; 446/122, 446/124–127; 273/156
See application file for complete search history.

(56) References Cited

U.S. PATENT DOCUMENTS

| | | | |
|---|---|---|---|
| D108,098 S | 1/1938 | Gilbert | |
| 3,252,287 A * | 5/1966 | Suzuki | 446/125 |
| 4,065,220 A | 12/1977 | Ruga | |
| D258,743 S | 3/1981 | Ruga | |
| 4,516,376 A * | 5/1985 | King | 403/171 |
| 4,787,191 A | 11/1988 | Shima | |
| D301,161 S | 5/1989 | Dunse | |
| 5,049,105 A | 9/1991 | Glickman | |
| 5,097,645 A * | 3/1992 | Sanderson | 403/171 |
| 5,137,486 A * | 8/1992 | Glickman | 446/126 |
| 5,190,403 A * | 3/1993 | Atkinson | 405/29 |
| 5,318,470 A | 6/1994 | Denny | |
| 5,421,666 A * | 6/1995 | Spears | 403/176 |
| 5,908,342 A * | 6/1999 | Wolvin | 403/171 |
| 6,641,453 B1 | 11/2003 | Morales et al. | |
| D488,515 S | 4/2004 | Balanchi | |
| D503,954 S | 4/2005 | Balanchi | |
| D513,628 S | 1/2006 | Andersen | |
| D519,588 S | 4/2006 | Carbonero | |
| 7,316,598 B1 | 1/2008 | Lock | |
| 7,318,764 B2 * | 1/2008 | Elias | 446/108 |

OTHER PUBLICATIONS

"LINX: the drinking straw construction game." Patrick Martinez. Aug. 2, 2012, [online], [retrieved on Nov. 6, 2014] Retrieved from the Internet <URL: https://web.archive.org/web/20120208231228/http://www.kickstarter.com/projects/29943525/linx-the-drinking-straw-construction-game?>.*

* cited by examiner

*Primary Examiner* — Daniel P Stodola
*Assistant Examiner* — Josh Skroupa
(74) *Attorney, Agent, or Firm* — Leason Ellis LLP

(57) ABSTRACT

A connector for a straw construction kit includes a body having a central base portion and a plurality of fingers extending radially outward from the central base portion and spaced apart from one another. The central base portion has a notch formed therein and being accessible between a pair of fingers. The finger is configured for insertion into one straw. The connector can be mated to another connector to form another connector having a different shape.

12 Claims, 5 Drawing Sheets

US 9,115,738 B2

CONNECTOR FOR STRAW CONSTRUCTION KIT

CROSS REFERENCE TO RELATED APPLICATION

Figure 1:
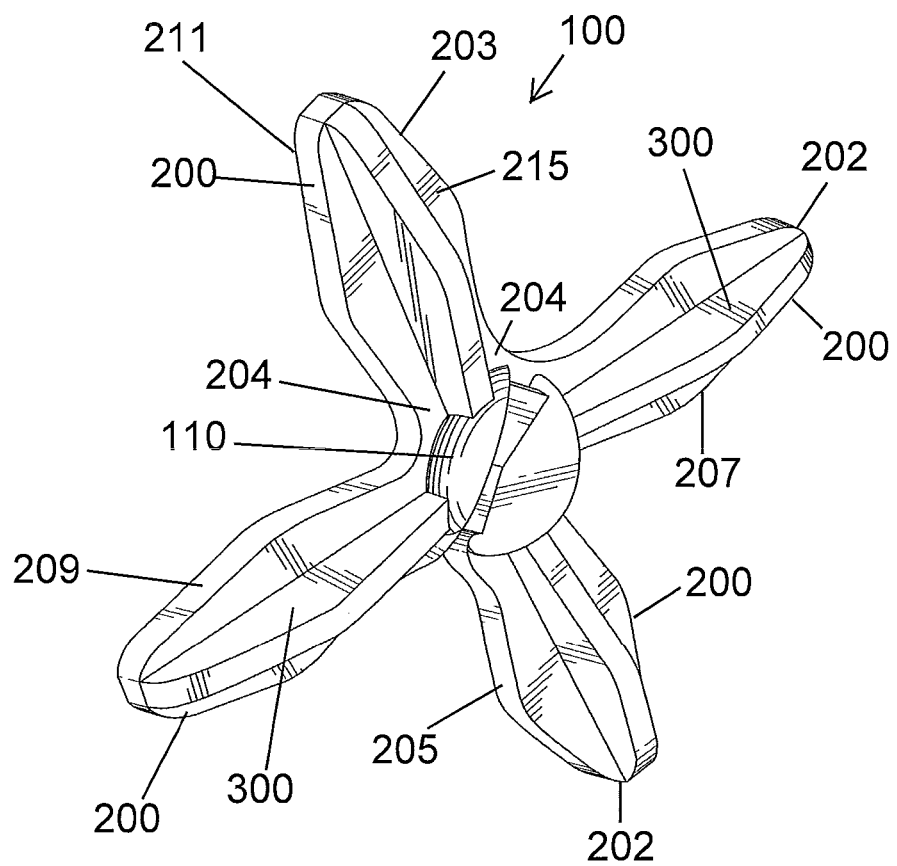

The present application claims the benefit, under 35 U.S.C. §120, of U.S. application Ser. No. 29/443,267, filed Jan. 15, 2013, which is hereby incorporated by reference in its entirety.

TECHNICAL FIELD

The present application relates to construction kits, such as toys and the like, and in particular, to a connector that can be connected to straws and connected to another connector to form a different shaped connector.

Background

Straw construction kits have existed for many years and are formed of a bundle of individual straws and a plurality of connectors. The user can create any number of different shaped objects by mating the straws with multiple connectors so as to create a shaped object. One of the limitations of previous connectors is that the connectors were static and are fixed in their constructions.

SUMMARY

A connector for a straw construction kit including a first connector part having a central base portion and a plurality of fingers extending radially outward from the central base portion and spaced apart from one another. The central base portion has a notch formed therein and is accessible between a pair of fingers. The connector also includes a second connector part having a central base portion and a plurality of fingers extending radially outward from the central base portion and spaced apart from one another. The central base portion has a notch formed therein and is accessible between a pair of fingers. Each finger is configured for insertion into one straw.

The connector has a first mode of use in which the first and second connector parts are detached from one another and a second mode of use in which the first and second connector parts are mated to one another with the first connector part lying in a first plane and the second connector part lying in a different second plane. The central base portion of the first connector part is received within the notch of the second connector part and the central base portion of the second connector is received within the notch of the first connector part.

BRIEF DESCRIPTION OF THE DRAWING FIGURES

Figure 2:
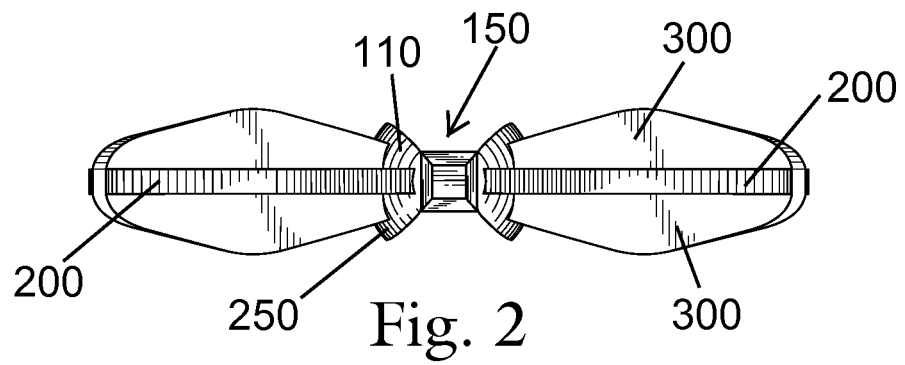
Figure 3:
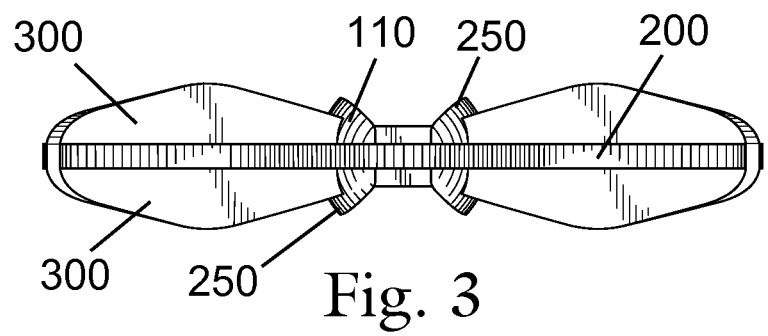
Figure 4:
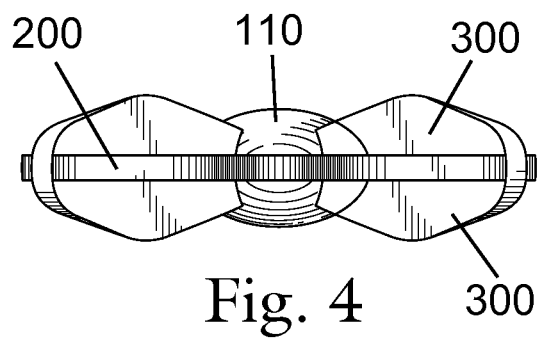
Figure 5:
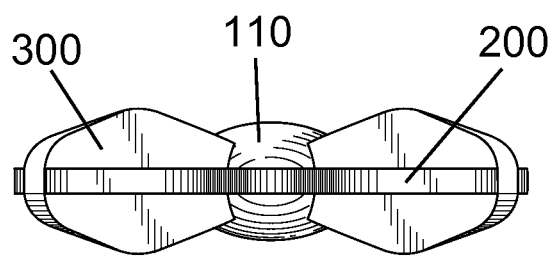
Figure 6:
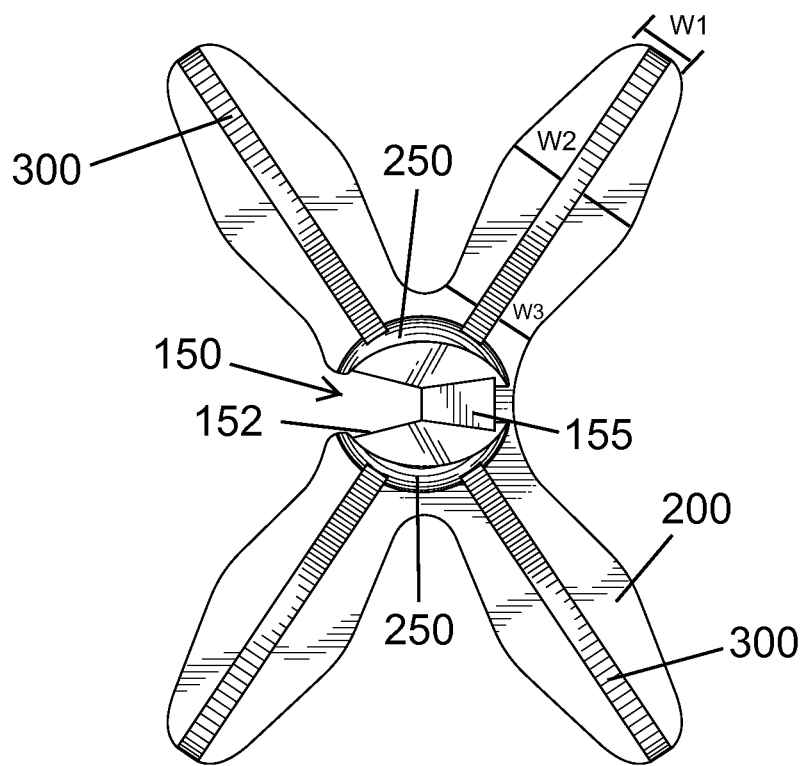
Figure 7:
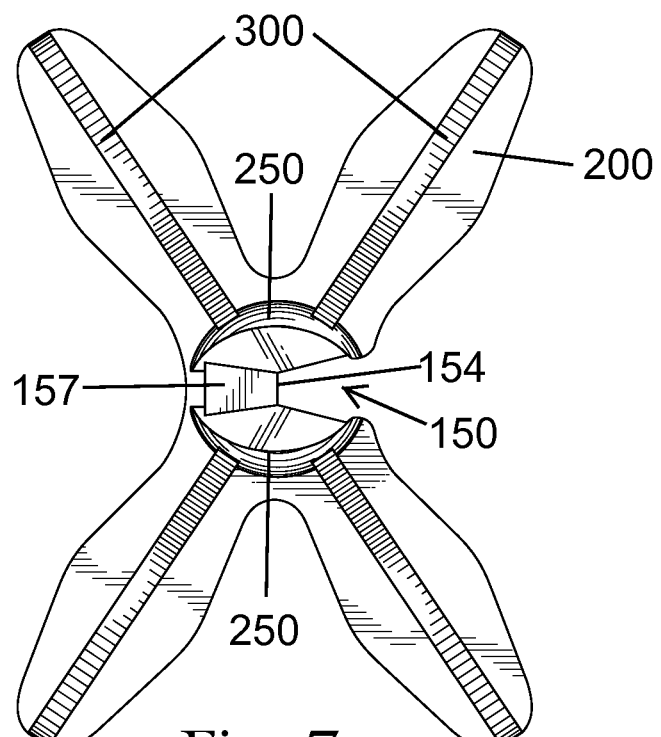
Figure 8:
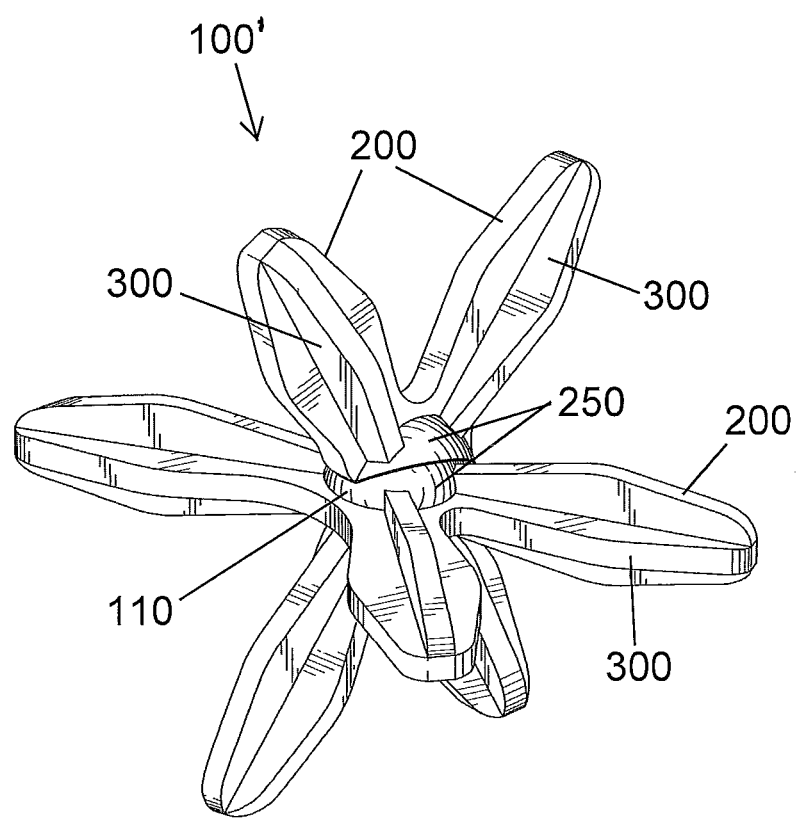

FIG. 1 is a side perspective view of a connector for a straw construction kit;
FIG. 2 is a front elevation view thereof;
FIG. 3 is a rear elevation view thereof;
FIG. 4 is a left side elevation view thereof;
FIG. 5 is a right side elevation view thereof;
FIG. 6 is a top plan view thereof;
FIG. 7 is a bottom plan view thereof;
FIG. 8 is side perspective view of two connectors releasably joined together; and
FIG. 9 is a side perspective view of a plurality of joined connectors, according to FIG. 8, being shown for connecting straws to form a three-dimensional object.

DETAILED DESCRIPTION OF CERTAIN EMBODIMENTS

Figure 9:
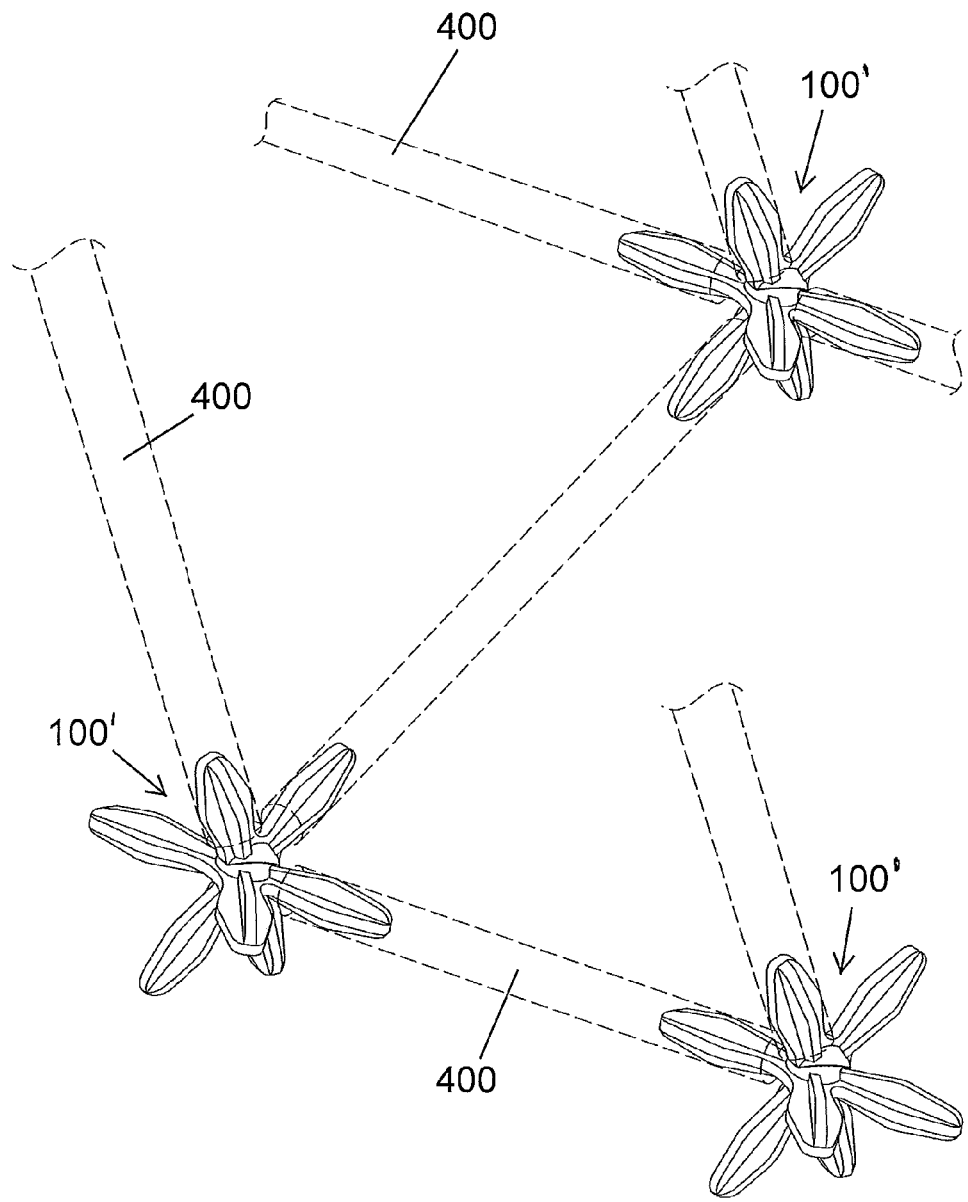

FIGS. 1-7 show a connector 100 in accordance with the present invention for use in a straw construction kit such as the one shown in FIG. 9. The connector 100 has a central base portion 110 which serves as a hub. The connector 100 includes a plurality of legs or fingers 200 which extend radially outward from the central base portion 110.

Each finger 200 is an elongated structure having a distal end 202 (tip) and an opposite proximal end 204 that integrally joins to the central base portion 110. The finger 200 does not have uniform width from end 202 to end 204 but instead has a variable width. In particular, distal end 202 can be in the form of a rounded tip (end) and has a first width (W1). From the distal end 202 toward (in the direction of) the central base portion 110, the finger 200 tapers outwardly and has a second width (W2) in a central region of the finger. The finger 200 then tapers inwardly toward the central base portion 110 to assume a third width (W3) at the proximal end 204 where the finger 200 joins the central base portion 110. The second width (W2) is greater than both the first width (W1) and the third width (W3) and the third width (W3) can be greater than or generally equal to the first width (W1).

As shown in the figures, there are four fingers 200 arranged in two pairs that are opposite one another. In other words, there is a first finger 203, a second finger 205 that is directly opposite the first finger 203 a third finger 207, and a fourth finger 209 that is directly opposite the third finger 207.

Each finger 200 has a first face or surface 211 and an opposite second face or surface 215.

As shown, each of the fingers 200 has a raised rib or rail 300 that extends centrally down the elongated finger 200 from end 202 to end 204 and protrudes outwardly from each of the first and second surfaces (faces) 211, 215 of the finger 200. As shown in FIG. 1, the raised rail 300 does not have a uniform height but instead has a variable height along its length. Instead, the raised rail 300 has a lesser height at ends 202, 204 and has a greater (maximum) height in a center portion thereof. The raised rail thus tapers upwardly from end 202 toward the center portion and then tapers downwardly to the end 204.

The edges of the finger 100 are smooth to allow easy insertion of the straw.

The central base portion 110 has an opening or notch 150 formed therein. The notch 150 is formed between two fingers 200. As shown in FIGS. 6-7, the notch 150 has a variable width in that the width of the notch 150 is greatest at an entrance 152 to the notch 150 and is at a minimum at its closed inner end 154. As shown in FIG. 2, the closed inner end 154 is defined by a number of angled surfaces, such as a beveled top edge 155 and a beveled bottom edge 157 that meet at a wall that defines the inner end 154.

As shown in FIGS. 6 and 7, the central base portion 110 includes a raised arcuate shaped wall 250 formed at the ends 204. The inner ends of the raised rails 300 terminate at the wall 250. The two walls 250 on the same side of the connector 100 are opposite one another with the notch 150 defined between first ends of the two walls 250.

One single connector 100 lies substantially planar (flat) on a flat substrate, such as a table since all four fingers 200 lie in the same plane.

A single connector 100 can be used in a straw construction kit by simply inserting a straw 400 on one or more of the fingers 200. The variable width of the finger 200 accommodates different sized straws and allows for easy initial insertion of the straw and then ensures a secure connection between the straw and the finger 200 due to the increased width of the finger 200 in its central portion as discussed above. Multiple straws 400 can be connected to multiple fingers 200 to define a shape.

In accordance with the present invention, the connector 100 is specifically constructed to allow secure attachment between two connectors 100 to define a different shaped connector that allows connection of straws 400 thereto at angles not possible with the use of a single connector.

FIG. 8 shows two connectors 100 mated together to form a new shaped connector 100'. To mate the two connectors 100 together, one connector 100 is oriented in a vertical plane and the other connector 100 is oriented in a horizontal plane, with the notches 150 of each facing one another. To securely attach the two connectors, the notch 150 of one connector 100 is guided into the notch 150 of the other connector 100. As shown in FIG. 8, the raised arcuate shaped walls 250 of the two connectors 100 define, when combined, a hemispherical shaped structure.

It will be appreciated that as shown in FIGS. 8 and 9, when mated together, the two connectors 100 define connector 100' that has eight (8) fingers 200, a set of four fingers 200 lying in a first plane and a set of four fingers 200 lying in a second plane offset from the first plane as shown in FIGS. 8 and 9. This allows the user to place straws at different locations not possible when only a single connector 100 is used.

The connector 100 can be formed of any number of different materials including but not limited to polymeric materials, such as various plastics. The connector 100 can thus be formed using a polymeric molding process.

What is claimed is:

1. A connector for a straw construction kit comprising:
a body having a central base portion and a plurality of fingers extending radially outward from the central base portion and spaced apart from one another, the central base portion having a notch formed therein and being accessible between a pair of fingers of the plurality of fingers, wherein each finger of the plurality of fingers is configured for insertion into one straw, wherein each finger extends from the central base portion and terminates at a distal end and each finger of the plurality of fingers has a first surface and an opposing second surface, the first surface having a first raised rib extending outwardly therefrom and extending longitudinally along a length of the finger from the central base portion to the distal end of the finger and the second surface having a second raised rib extending outwardly therefrom and extending longitudinally along a length of the finger from the central base portion to the distal end of the finger, wherein a height of each of the first and second rib varies along a length thereof, wherein each rib is defined by a first angled section that extends from the central base portion to an intermediate point defined along the rib and a second angled section that extends from the intermediate point and terminates at the distal end of the finger, wherein the rib has a maximum height relative to the respective first or second surface at the intermediate point.

2. The connector of claim 1, wherein each of the first and second connector parts includes four fingers.

3. The connector of claim 2, wherein a first pair of fingers of the plurality of fingers is located opposite one another and a second pair of fingers of the plurality of fingers is located opposite one another.

4. The connector of claim 1, wherein each finger has a variable width with a central portion of each finger being wider than the distal end of the finger.

5. The connector of claim 4, wherein a width of each finger tapers outwardly from the distal end to the central portion and then tapers inwardly from the central portion to the central base portion.

6. The connector of claim 1, wherein the notch of each of the first and second connector parts is defined by a first beveled surface and a second beveled surface and a wall extending between the first and second beveled surfaces, the wall defining a rear of the notch.

7. The connector of claim 1, wherein the central base portion of each of the first and second connectors includes raised arcuate shaped portions on either side of the notch.

8. The connector of claim 7, wherein the first angled section of each of the first and second ribs intersects at least one of the raised arcuate shaped portions on either side of the notch.

9. The connector of claim 1, wherein each finger, in combination with the first and second ribs, has an X-shaped cross-section.

10. The connector of claim 1, wherein the finger is constructed such that an inner portion of the finger that terminates at the central base section is defined by opposing first and second sides that taper outwardly and an outer portion of the finger that terminates at the distal end, wherein in the outer portion, the first and second edges taper inwardly.

11. A straw construction kit comprising:
a connector including:
a first connector part having a central base portion and a plurality of fingers extending radially outward from the central base portion and spaced apart from one another, the central base portion having a notch formed therein and being accessible between a pair of fingers; and
a second connector part having a central base portion and a plurality of fingers extending radially outward from the central base portion and spaced apart from one another, the central base portion having a notch formed therein and being accessible between a pair of fingers;
wherein each finger of the plurality of fingers is configured for insertion into one straw, wherein each finger of the plurality of fingers has a first surface and an opposing second surface, the first surface having a first raised rib extending outwardly therefrom and extending longitudinally along a length of the finger from the central base portion to a distal end of the finger and the second surface having a second raised rib extending outwardly therefrom and extending longitudinally along a length of the finger from the central base portion to the distal end of the finger, wherein a height of each of the first and second rib varies along a length thereof, wherein each rib is defined by a first angled section that extends from the central base portion to an intermediate point defined along the rib and a second angled section that extends from the intermediate point and terminates at the distal end of the finger, wherein the rib has a maximum height relative to the respective first or second surface at the intermediate point;
wherein the connector has a first mode of use in which the first and second connector parts are detached from one another and a second mode of use in which the first and second connector parts are mated to one another with the first connector part lying in a first plane and the second connector part lying in a different second plane; and a plurality of straws for mating with selected fingers to form a connected object.

12. The kit of claim 11, wherein each of the first and second raised ribs includes a first beveled section and a second beveled section, the first and second beveled sections meeting in a middle portion of the raised rib which defines a maximum height of the raised rib.

* * * * *